Aug. 7, 1934.   B. L. BOBROFF   1,969,116
SIGNALING DEVICE
Filed Aug. 8, 1929
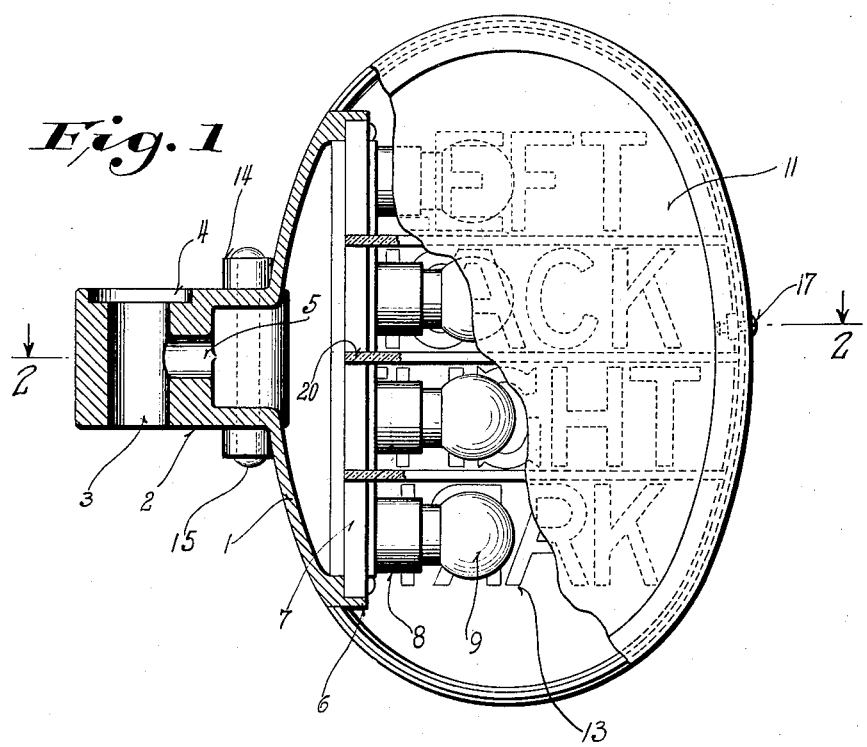
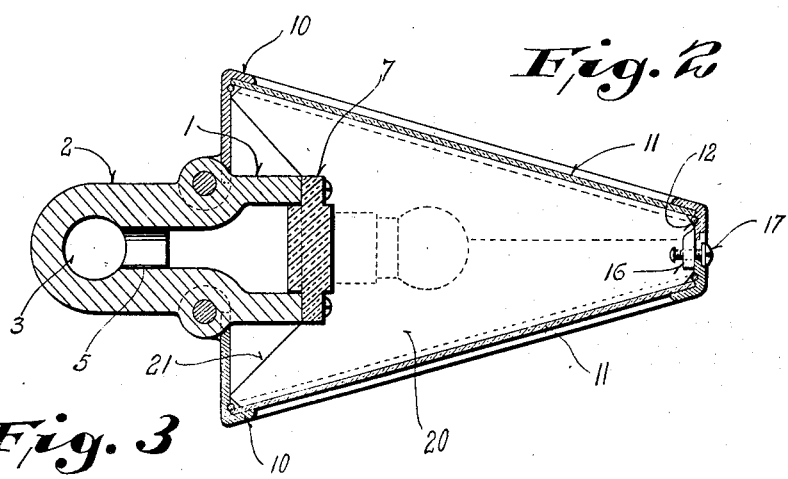
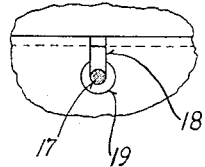
Inventor
Barnett L. Bobroff
By Arthur R. Woolfolk
Attorney Patented Aug. 7, 1934

1,969,116

UNITED STATES PATENT OFFICE

1,969,116

SIGNALING DEVICE

Bornett L. Bobroff, Racine, Wis.

Application August 8, 1929, Serial No. 384,279

2 Claims. (Cl. 177—329)

This invention relates to signaling devices and is particularly directed to signaling devices adapted for use on automotive vehicles.

Objects of this invention are to provide novel forms of signal devices which may be secured to opposite sides of an automotive vehicle and which are so constructed that each of the devices presents a front wall and a back wall arranged at an angle to each other so that the planes of the walls form a dihedral angle between them, thus rendering the front wall visible from the front of the vehicle and throughout a wide side angle, and the back wall visible from the rear of the vehicle and throughout a wide side angle, the front and back walls being preferably formed of light transmitting material and having normally invisible designations or insignia thereon, adapted to be selectively rendered visible by the selective lighting of any of a plurality of signal lamps.

Further objects are to provide a construction in which the signal devices may serve, not only in their capacity of signal means, but may replace the usual parking side lights and may thus serve in the additional capacity of parking lights.

This invention is designed to provide signal devices which may be used in any suitable signal system such as that disclosed in my copending application, Serial Number 377,821 filed July 12, 1929 for Signaling systems for automotive vehicles.

In driving automobiles in congested districts, upon highways, at crossings, and at other places, it is desirable that the driver of a vehicle be enabled to signal, not only to following drivers or pedestrians, but also to those at the sides, front and back of his intended direction of travel.

This invention is designed to provide a signal device which may be mounted upon the side of an automotive vehicle, which is so made that it will give signals indicating the intention of the driver, and in which the signals are visible from the front, rear and sides of the vehicle, so that the drivers or pedestrians may accordingly vary or continue their courses without confusion or hesitation.

Further objects are to provide a signal device which is approximately triangular in horizontal cross section, which has front and rear walls provided with designations or insignia and formed of glass or similar material, which is provided with a body portion to which at least one of the front and rear walls is hingedly joined, preferably by means of a hinge having a vertical axis, and in which the front and rear walls are provided with interlocking edges.

Further objects are to provide a signal device in which the body portion carries an insulating panel provided with outwardly projecting partitions formed rigid with the panel, in which a plurality of signal lamps are carried by the body portion and separated by successive partitions and in which the outwardly projecting front and rear walls are preferably formed with rounded outer edges which cooperate with the body portion to form a substantially oval side face.

Further objects are to provide a signaling device for automotive vehicles which is provided with front and rear walls and with a novel locking means which will not readily become loosened from the jarring of the vehicle, and which is so made that a locking screw provides a positive lock for the walls and is so related to the device that it cannot be completely removed at any time.

An embodiment of the invention is shown in the accompanying drawing, in which:

Figure 1 is a side elevation, partly in section, of the signal device.

Figure 2 is a sectional view on the line 2—2 of Figure 1.

Figure 3 is a fragmentary end view of the device showing the locking means.

Referring to the drawing it will be seen that the device comprises a body portion 1, having a rearwardly projecting portion 2 provided with an aperture 3 adapted to receive a tubular conductor-carrying stem. Preferably a recessed portion 4 is provided for the reception of a locking nut (not shown). The body portion is provided with a hollow interior which communicates with the aperture 3 by means of the passage-way or opening 5 through which conductors leading to the signal lamps, hereinafter described, may pass.

The body portion is provided with upper and lower flanges 6 between which an insulating panel 7 is mounted. This insulating panel may be provided with a rearwardly projecting narrow portion, as shown in Figure 2, which fits between the forward edges of the body portion. The insulating panel is, therefore, very accurately positioned upon the body portion by means of this construction and serves to close the hollow interior of the body portion. It is retained in place by means of screws as indicated.

The insulating panel 7 carries a plurality of lamp sockets 8 which receive the signal lamps 9. The signal lamps are adapted to be selectively lighted in any suitable manner, as described in my copending application above noted.

The body portion carries a pair of side members 10 which have cut-out portions provided with light conducting front and rear walls 11. These front and rear walls are held in place by means of split wire rings 12 which seat within sockets formed in the front and rear members, as shown most clearly in Figure 2.

The light transmitting front and rear walls are provided with insignia such as indicated by the reference character 13. These insignia may take the form of words, for example; "Left", "Back", "Right", "Park".

The front and rear members are provided with upper and lower rear lugs 14 which are hinged, by means of the pintle pin 15, to the neck 2 of the body portion of the device.

As shown particularly in Figures 2 and 3, the side members 10 have interlocking edges so as to secure an adequate and reliable joint between the abutting edges.

Means are provided for holding the side members in closed or locked position, as shown in Figure 2. These means may comprise a lug 16 which fits within or is overlapped by the edge of the other member. The lug 16 carries a headed screw 17 whose rear end is enlarged, as shown in Figure 2, to prevent complete unscrewing of the screw.

The member which does not carry the lug 16 is provided with a slot 18 through which the shank of the screw may pass and is provided with a recess 19 adapted to receive the head of the screw when the screw is screwed tight. The screw, therefore, provides a positive lock for holding the device closed.

It is to be noted that partitions 20 are located between successive electric lamps, as shown in Figures 1 and 2. These partitions are preferably formed of insulating material and may be moulded integrally with the insulating panel 7, if desired, or may be forced within slots formed in the insulating panel as indicated in the drawing. These partitions may have their rear corners trimmed off along slanting lines on their inner sides as indicated at 21 of Figure 2 to avoid the necessity of an accurate fit between these edges and the adjacent portion of the body portion. These partitions are preferably formed of insulating material as it is intended that they shall contact with the glass front and rear walls 11 of the device and as there is, therefore, less tendency to cracking of the glass walls than if the partitions had been formed of metal. It is to be distinctly understood, however, that it is within the province of this invention to form the partitions of metal if so desired.

Particular emphasis is laid upon the fact that the front and rear walls are outwardly converging and form between them a dihedral angle. This construction insures wide side angles for the walls, throughout which, the walls are visible. In other words, the front wall is visible from the front and through a wide side angle and the rear wall is visible from the rear and throughout a wide rear angle.

By means of this construction pedestrians and other drivers may be easily apprised of the intention of the driver whether or not the pedestrians are located in the front, rear or at the sides of the vehicle provided with the signaling device.

It will be seen that a very simple, serviceable and easily produced construction has been provided by this invention.

It will be seen further that the devices may be attached to the sides of automotive vehicles such, for instance, as automobiles, with the assurance that a very attractive and effective signaling device is obtained and one which is visible throughout wide side angles as well as from the front and back.

As a matter of fact, the signaling devices may replace the parking lights if so desired.

Although the invention has been described in considerable detail, it is intended that such description be interpreted as illustrative rather than limiting, as the invention may be variously embodied and is to be interpreted as claimed.

I claim:

1. A device comprising a body portion having a pair of spaced vertical walls and a rear wall forming a channel adapted to receive conductors, a supporting strip across the front of said channel, lamp sockets carried by said strip, signal lamps carried by said sockets, partitions between said signal lamps, a rear lug carried by said rear wall and having an opening communicating with said channel, and a pair of side panels having light transmitting portions, said side panels converging towards the front of said device, and having inwardly turned portions hingedly joined to said side walls to space the rear portions of said side panels apart, whereby a forwardly converging device is produced, and whereby said side panels are spaced from said signal lamps.

2. A device comprising a body portion having a pair of spaced vertical walls and a rear wall forming a channel to receive conductors, said rear wall having an opening through which conductors may pass, a supporting strip across the front of said channel, lamp sockets carried by said strip, signal lamps carried by said sockets, partitions between said signal lamps, and a pair of side panels having light transmitting portions, said side panels converging towards the front of said device, and having inwardly turned portions hingedly joined to said side walls to space the rear portions of said side panels apart, whereby a forwardly converging device is produced, and whereby said side panels are spaced from said signal lamps.

BORNETT L. BOBROFF.